(12) United States Patent
Van De Walle

(10) Patent No.: US 9,179,639 B2
(45) Date of Patent: Nov. 10, 2015

(54) MILKING SYSTEM AND METHOD FOR MILKING A HERD OF DAIRY ANIMALS

(75) Inventor: Jacobus Izaak Van De Walle, Nuenen (NL)

(73) Assignee: LELY PATENT N.V., Maassluis (NL)

( * ) Notice: Subject to any disclaimer, the term of this patent is extended or adjusted under 35 U.S.C. 154(b) by 264 days.

(21) Appl. No.: 13/534,064

(22) Filed: Jun. 27, 2012

(65) Prior Publication Data
US 2013/0167775 A1     Jul. 4, 2013

Related U.S. Application Data

(63) Continuation of application No. PCT/NL2010/000162, filed on Nov. 9, 2010.

(51) Int. Cl.
*A01K 1/12* (2006.01)
*A01J 5/007* (2006.01)

(52) U.S. Cl.
CPC . *A01J 5/007* (2013.01); *A01K 1/12* (2013.01); *A01K 1/126* (2013.01)

(58) Field of Classification Search
CPC ......... A01K 1/12; A01K 1/123; A01K 1/126; A01J 5/007
USPC .............. 119/14.02, 14.03, 14.14, 14.18, 840
See application file for complete search history.

(56) References Cited

U.S. PATENT DOCUMENTS

| | | | | |
|---|---|---|---|---|
| 5,784,993 | A * | 7/1998 | Osthues et al. | 119/14.04 |
| 6,050,219 | A * | 4/2000 | van der Lely | 119/14.08 |
| 7,721,675 | B2 * | 5/2010 | Kaever et al. | 119/14.08 |
| 8,624,744 | B2 * | 1/2014 | Holmgren et al. | 340/573.3 |

FOREIGN PATENT DOCUMENTS

| | | |
|---|---|---|
| EP | 1474970 A1 | 11/2004 |
| WO | 97/37530 A | 10/1997 |
| WO | 02/19806 A1 | 3/2002 |
| WO | 0219806 A1 | 3/2002 |
| WO | 2006/068582 A1 | 6/2006 |
| WO | 2006/098678 A1 | 9/2006 |
| WO | 2006098678 A1 | 9/2006 |
| WO | 2008/140407 A1 | 11/2008 |
| WO | 2008140407 A1 | 11/2008 |

(Continued)

OTHER PUBLICATIONS

International Search Report of PCT/NL2010/000162 issued on Mar. 2, 2011.

(Continued)

*Primary Examiner* — Yvonne Abbott-Lewis
(74) *Attorney, Agent, or Firm* — Hoyng Rokh Monegier; Minerva Rivero; David P. Owen

(57) ABSTRACT

A milking system for milking a herd of dairy animals includes a first milking device and a second milking device, an identification device for identifying dairy animals to be milked of a herd of dairy animals, and a control device for determining an estimated treatment time of each dairy animal to be milked. The control device also classifies each dairy animal to be milked with the aid of a criterion on the basis of the estimated treatment time in at least a first or second group of dairy animals. The milking system admits the first group of dairy animals to preferably only the first milking device and admits the second group to preferably only the second milking device.

14 Claims, 2 Drawing Sheets

(56) References Cited

FOREIGN PATENT DOCUMENTS

| | | |
|---|---|---|
| WO | 2009/093964 A1 | 7/2009 |
| WO | 2009093964 A1 | 7/2009 |

OTHER PUBLICATIONS

Notice of Opposition against European counterpart EP2521443 filed on Jun. 30, 2014 by DeLaval International AB.

J. F. Smith et al., 'Relication and Expansion Planning for Dairy Producers', Dairy Day 1999.

'Rotary milking planning guide—DeLaval parallel rotary PR1100 and PR2100', DeLaval 2009.

R. Nitzan et el., 'Stochastic Models for Simulating Parallel, Rotary, and Side-Opening Milking Parlors', J. Dairy Sci. 89: 4462-4472, 2006.

S. Balloni et al., 'Shortening the Length of Dairy Cow Machine Milking Grouping Animals in Function of Milk Extraction Rate', Sep. 15-17, 2008.

* cited by examiner

MILKING SYSTEM AND METHOD FOR MILKING A HERD OF DAIRY ANIMALS

CROSS REFERENCE TO RELATED APPLICATIONS

This application is a continuation of PCT application number PCT/NL2010/000162 filed on 9 Nov. 2010, which claims priority from Netherlands application number 1037611 filed on 5 Jan. 2010. Both applications are hereby incorporated by reference in their entireties.

BACKGROUND OF THE INVENTION

1. Field of the Invention

The invention relates to a milking system for milking a herd of dairy animals, comprising a first milking device, an identification device for identifying dairy animals to be milked of the herd of dairy animals, and a control device which is designed to determine an estimated treatment time of each dairy animal to be milked, and wherein the control device is designed to classify each dairy animal to be milked that has been identified by the identification device with the aid of a criterion on the basis of the estimated treatment time in at least a first or second group of dairy animals, and wherein the milking system is designed to admit one or more dairy animals classified in the first group to the first milking device in order to milk said dairy animals by the first milking device.

2. Description of the Related Art

A device and method for improving the throughput capacity of a milking carrousel are known from WO2009/093964, which is hereby incorporated by reference in its entirety. The milking carrousel comprises a rotating platform with a plurality of milking stalls which are each provided with milking facilities for milking a dairy animal. The dairy animals are successively admitted to the rotating platform. The rotating platform rotates slowly at a speed that is adjusted to the milking time required for milking the dairy animals on the rotating platform, so that each dairy animal has been milked completely when the dairy animal has made an almost complete rotation. In order to increase the throughput capacity the dairy animals are classified in two groups of dairy animals on the basis of estimated milking times. The first group of dairy animals has a relatively short milking time, while the milking time of the dairy animals of the second group of dairy animals is relatively long. The fast dairy animals are led directly to the rotating platform in order to be milked. During the milking of the fast dairy animals, the slow dairy animals are delayed in a waiting area. Only after the fast dairy animals on the rotating platform have been milked, the slow dairy animals are admitted to the rotating platform from the waiting area.

However, the milk production capacity of this milking device is still limited. Moreover, the health of the slow dairy animals is adversely affected by their delay in the waiting area. Waiting makes these dairy animals restless. Furthermore, the tension in the udders of these dairy animals during the waiting time can result in medical conditions.

BRIEF SUMMARY OF THE INVENTION

It is an object of the invention to provide an improved milking system.

This object is achieved according to the invention in that the milking system comprises a second milking device, and the milking system is designed to admit one or more dairy animals classified in the second group to the second milking device in order to milk said dairy animals by the second milking device. Instead of delaying the second group of dairy animals in a waiting area and milking said second group of dairy animals in the same milking device as the first group of dairy animals, the dairy animals of the second group of dairy animals are admitted to a second milking device. The second group of dairy animals need not wait until the dairy animals of the first group of dairy animals have been milked. The milking of the two groups of dairy animals does not take place successively but can be carried out simultaneously in the first and the second milking device. In this case it is possible to optimize each of the first milking device and the second milking device for the first group, the second group, respectively, of dairy animals. According to the invention, by applying two milking devices the milk production capacity of the milking system will thus more than double. As a result thereof, the throughput capacity of the milking system is considerably improved.

A further advantage of the invention is that the waiting time for the second group of dairy animals is reduced, which is beneficial for the health of the dairy animals of the second group of dairy animals.

It is possible that the milking system is configured to admit one or more dairy animals classified in the first group to only the first milking device in order to milk said dairy animals by the first milking device, and that the milking system is configured to admit one or more dairy animals classified in the second group to only the second milking device in order to milk said dairy animals by the second milking device. The first and second milking devices each comprise milking stalls which are each provided with milking facilities for milking a dairy animal. During operation, the dairy animals classified in the first group are led to the first milking device, while the dairy animals classified in the second group are led to the second milking device. During maintenance or repair of one of the milking devices it is incidentally possible that the dairy animals intended for the milking device in question are admitted to the other, still operating milking device.

The estimated treatment time for the milking of a dairy animal can be determined on the basis of different parameters. The estimated treatment time for the milking of a dairy animal comprises, for example, an estimated milking time for milking said dairy animal and/or an estimated pre-treatment time for pre-treating said dairy animal prior to the milking and/or an estimated post-treatment time for post-treating said dairy animal after the milking. The pre-treatment time depends, for example, on a time for pre-cleaning the teats of said dairy animal and/or an estimated connection time for connecting the teat cups to the teats of said dairy animal. The estimated treatment time can be calculated on the basis of the above-mentioned parameters and/or other parameters or be determined in another manner by the control device which is provided with a memory with historical data of the dairy animals of the herd.

It is possible for the control device to be designed to classify each dairy animal to be milked that has been identified by the identification device in the first group of dairy animals if the estimated treatment time for the milking of said dairy animal is shorter than a threshold value and to classify each dairy animal to be milked that has been identified by the identification device in the second group of dairy animals if the estimated treatment time for the milking of said dairy animal is longer than that threshold value. The threshold value determines the number of dairy animals which are classified in the first and the second group of dairy animals per unit of time. For, in dependence on the threshold value, more or fewer dairy animals are allotted to the first and the second group of dairy animals. The threshold value can be adjustable and variable over time.

In one embodiment, the first milking device comprises a first carrousel and the second milking device comprises a second carrousel, wherein each carrousel is provided with a plurality of milking stalls for in each case one dairy animal. In this case, it is possible that the rotational speed of the first carrousel is adjustable on the basis of the longest estimated treatment time for the milking of the dairy animals admitted to the first carrousel, wherein the rotational speed of the second carrousel is adjustable on the basis of the longest estimated treatment time for the milking of the dairy animals admitted to the second carrousel. The rotational speed of each carrousel is limited by the dairy animal with the longest estimated treatment time present on that carrousel. As, during operation, dairy animals are continuously admitted to the carrousels and continuously leave the carrousels, the longest estimated treatment time for the milking of the dairy animals admitted to the carrousels will vary over time for each carrousel. The velocities of the carrousels can be adjusted over time to the varying longest estimated treatment time. Incidentally, the longest estimated treatment time defines an upper limit for the rotational speed of the carrousels. It is possible that the rotational speeds of the carrousels are lower than the maximum rotational speed which is defined by the longest estimated treatment time. This can, for example, be favourable for optimizing the milking system as a whole.

It is possible that the rotational speed of the first carrousel, the rotational speed of the second carrousel and the threshold value are adjustable by the control device, and that the rotational speed of the first carrousel, the rotational speed of the second carrousel and the threshold value are set in such a manner that the number of dairy animals which are classified by the control device in the first group per unit of time substantially equals the number of dairy animals milked which leave the first carrousel per unit of time, and the number of dairy animals which are classified by the control device in the second group per unit of time substantially equals the number of dairy animals milked which leave the second carrousel per unit of time.

The throughput capacity of a carrousel is defined by the number of dairy animals which can be milked by said carrousel per unit of time. The throughput capacities of the carrousels can vary over time. The rotational speeds of the carrousels are adjusted to the respective throughput capacities. The threshold value is selected in such a manner that the number of dairy animals which are classified in the first and the second group of dairy animals and are directed to the first carrousel, the second carrousel, respectively, substantially equals the number of dairy animals which leave the first carrousel, the second carrousel, respectively. It is thus avoided that dairy animals queue to enter the carrousels, which is beneficial for the production capacity of the milking system. Incidentally, the threshold value can also be selected differently. This would result in a queue of waiting dairy animals before one of the carrousels. In that case, the waiting dairy animals can be received in a waiting area.

The invention also relates to a method for milking a herd of dairy animals, comprising:
- identifying dairy animals to be milked of the herd of dairy animals,
- determining an estimated treatment time for the milking of each dairy animal to be milked,
- classifying each dairy animal to be milked that has been identified by the identification device with the aid of a criterion on the basis of the estimated treatment time in at least a first or second group of dairy animals,
- admitting one or more dairy animals classified in the first group of dairy animals to a first milking device,
- milking the dairy animals admitted to the first milking device by the first milking device.

According to the invention, one or more dairy animals classified in the second group are admitted to a second milking device and the dairy animals admitted to the second milking device are milked by the second milking device. This results in a considerable increase of the production capacity.

During normal operation, it is possible that one or more dairy animals classified in the first group are admitted to only the first milking device in order to milk said dairy animals by the first milking device, and that one or more dairy animals classified in the second group are admitted to only the second milking device in order to milk said dairy animals by the second milking device.

In this case it is possible that the estimated treatment time for the milking of a dairy animal comprises an estimated milking time for milking said dairy animal and/or an estimated pre-treatment time for pre-treating said dairy animal prior to the milking, which pre-treatment time comprises for example a time for pre-cleaning the teats of said dairy animal and/or an estimated connection time for connecting the teat cups to the teats of said dairy animal, and/or an estimated post-treatment time for post-treating said dairy animal after the milking.

Each dairy animal to be milked that has been identified by the identification device can be classified in the first group of dairy animals if the estimated treatment time for the milking of said dairy animal is shorter than a threshold value and in the second group of dairy animals if the estimated treatment time for the milking of said dairy animal is longer than that threshold value.

It is possible that the first milking device comprises a first carrousel and the second milking device comprises a second carrousel, and wherein each carrousel is provided with a plurality of milking stalls for in each case one dairy animal. The rotational speed of the first carrousel can be set on the basis of the longest estimated treatment time for the milking of the dairy animals admitted to the first carrousel, and wherein the rotational speed of the second carrousel is set on the basis of the longest estimated treatment time for the milking of the dairy animals admitted to the second carrousel.

It is possible that the rotational speed of the first carrousel, the rotational speed of the second carrousel, and the threshold value are set in such a manner that the number of dairy animals classified by the control device in the first group per unit of time substantially equals the number of dairy animals milked which leave the first carrousel per unit of time and the number of dairy animals classified by the control device in the second group substantially equals the number of dairy animals milked which leave the second carrousel per unit of time.

It is also possible that a plurality of dairy animals classified in the first group are admitted on the basis of batches to the first milking device in order to milk said dairy animals on the basis of batches by the first milking device, and wherein a plurality of dairy animals classified in the second group are admitted on the basis of batches to the second milking device in order to milk said dairy animals on the basis of batches by the second milking device. The invention is not limited to carrousels, but can also be applied with other milking devices. If the dairy animals are milked in two or more milking devices on the basis of batches, there may be provided a waiting area for at least one of the milking devices. The waiting area is intended to receive dairy animals which cannot yet be admitted to the milking device.

BRIEF DESCRIPTION OF THE DRAWINGS

The features and advantages of the invention will be appreciated upon reference to the following drawings, in which.

DESCRIPTION OF ILLUSTRATIVE EMBODIMENTS

The following is a description of certain embodiments of the invention, given by way of example only and with reference to the drawings.

Figure 1:
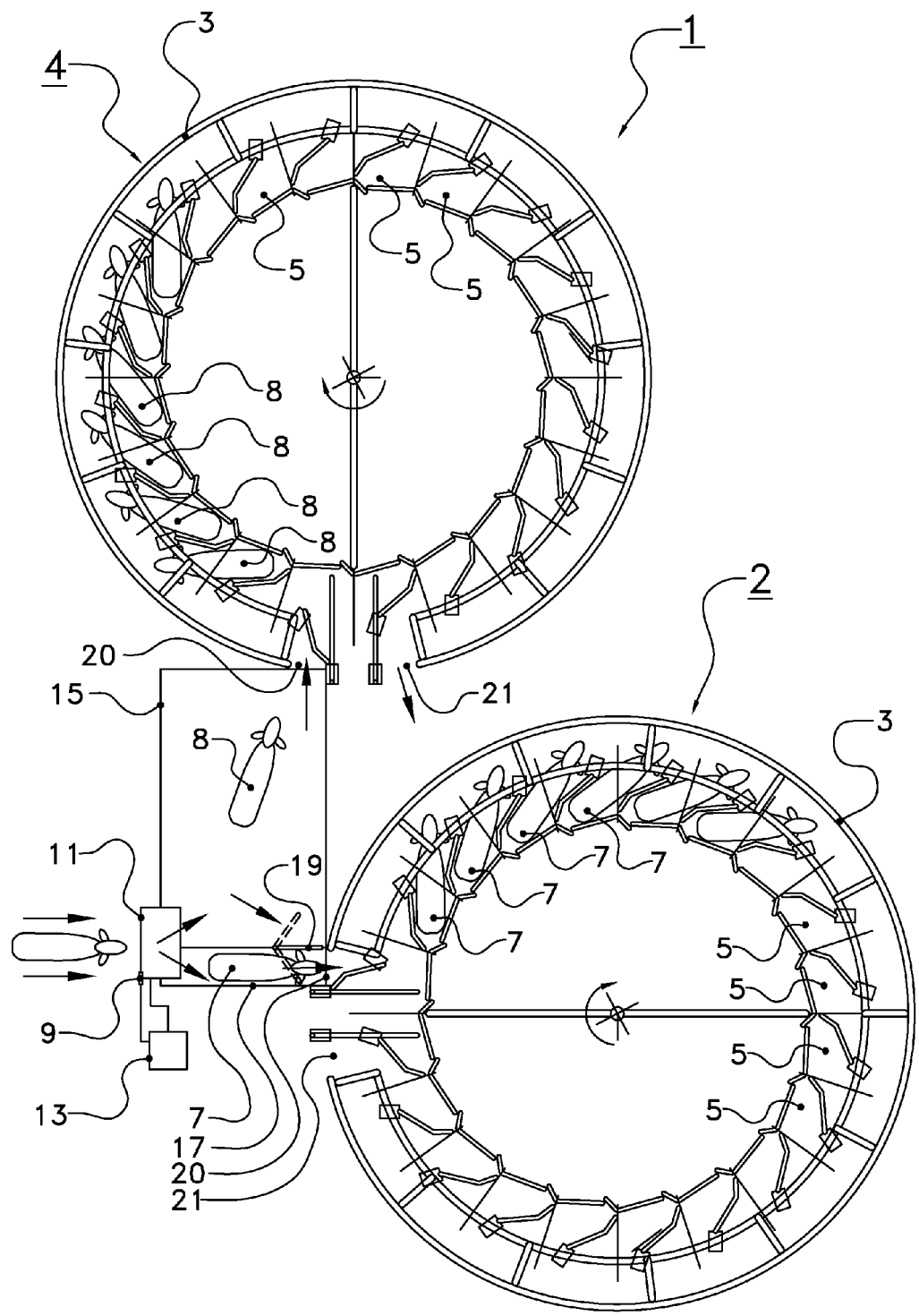
FIG. 1 is a schematic top view of a first embodiment of a milking system according to the invention.

The milking system for milking a herd of dairy animals is indicated as a whole by 1 in FIG. 1. The milking system 1 comprises two milking devices 2, 4 which are designed as carrousels in this exemplary embodiment. Each carrousel 2, 4 comprises a round rotating platform 3 which is rotatable about a substantially vertical centre line (see the arrows). The carrousels 2, 4 are each drivable by a drive device (not shown). On the rotating platform 3 of each carrousel 2 there are provided a number of milking stalls 5 which are each provided with milking facilities. Each carrousel 2, 4 has an entrance 20 for admitting a dairy animal to the carrousel 2, 4. From the entrance 20 the admitted dairy animal is led into one of the milking stalls 5. Each of the carrousels 2, 4 is also provided with an exit 21. After an almost complete rotation, the dairy animals leave the carrousels through the exit 21.

The milking facilities (not shown) of each milking stall 5 comprise for example four teat cups which can be connected, disconnected, respectively, automatically by means of a robot arm or manually, to, from, respectively, the teats of a dairy animal. Each of the teat cups has a teat space for receiving a teat of the dairy animal, and a pulsation space for performing a milking movement by a pulsating vacuum. The teat spaces of the teat cups are connected to a milk collecting vessel. The milk collecting vessel comprises a vacuum connection to apply a vacuum to the milk collecting vessel during a milking. As a result thereof, an air/milk mixture is transferred from the teat cups to the collecting vessel. The milk collecting vessel serves for temporary storage of the milked milk and for separating air from the air/milk mixture. The vacuum is generated by a vacuum pump. However, the milking facilities may also be designed differently.

The milking system 1 comprises an identification device 9 for identifying individual dairy animals. The dairy animals report voluntarily at the milking system 1 or are led to the milking system 1. The identification device 9 is connected to a control device 13 which is provided with a memory with historical data of the dairy animals of the herd of dairy animals. After the identification device 9 has identified a dairy animal to be milked, the control device 13 calculates the estimated treatment time for the milking of said dairy animal on the basis of the historical data of the identified dairy animal. The estimated treatment time depends, for example, on the estimated time for pre-treating, the time for milking, and the time for post-treating. The pre-treating comprises, for example, cleaning of the teats and connecting the teat cups to the teats, while during post-treating, for example, disconnecting the teat cups from the teats and cleaning of the teat cups are carried out.

After the control device 13 has calculated the estimated treatment time of the identified dairy animal, the estimated treatment time is compared with a threshold value. If the estimated treatment time is shorter than the threshold value, the control device 13 classifies the identified dairy animal in a first group of dairy animals. The dairy animals 7 of the first group form relatively fast-milking dairy animals. In the case of an estimated treatment time which is longer than the threshold value, the identified dairy animal is allotted by the control device 13 to a second group of dairy animals. The dairy animals 8 of the second group form relatively slow-milking dairy animals.

The control device 13 is connected to a sorting or selecting gate device 11. In dependence on the classification of the identified dairy animal in the first or the second group, the control device 13 operates the sorting or selecting gate device 11. If the identified dairy animal is a relatively fast-milking dairy animal 7, the sorting or selecting gate device 11 directs the identified dairy animal to a first passage 17 which leads to the first carrousel 2. In the case of a relatively slow-milking dairy animal 8, the control device 13 operates the sorting or selecting gate device 11 to bring the identified dairy animal to a second passage 15. The relatively slow-milking dairy animal 8 is directed via the second passage 15 to the second carrousel 4.

The relatively fast-milking dairy animals 7 are milked by the first carrousel 2, while milking of the relatively slow-milking dairy animals 8 takes place on the second carrousel 4. The drive device of each carrousel 2, 4 is connected to the control device 13. The rotational speeds of the carrousels 2, 4 are dynamically adjusted, so that each dairy animal on the carrousels 2, 4 can be milked completely during a rotation from the entrance 20 to the exit 21. The maximum rotational speed of the first carrousel 2 is limited by the longest estimated treatment time of the relatively fast-milking dairy animals 7 which are present on the first carrousel 2. At the same time, the maximum rotational speed of the second carrousel 4 is limited by the longest estimated treatment time of the relatively slow-milking dairy animals 8 which are present on the second carrousel 4. The rotational speeds of the carrousels 2, 4 can therefore be optimized independently of one another. In this case, the rotational speeds of the carrousels 2, 4 can incidentally be lower than the maximum rotational speeds. Nevertheless, the rotational speed of the first carrousel 2 is higher than the rotational speed of the second carrousel 4. This is beneficial for the production capacity of the milking system 1.

The threshold value for classifying an identified dairy animal in the first or the second group is settable. The control device 13 calculates for example the threshold value and the rotational speeds of the carrousels 2, 4 in mutual dependence. The threshold value can be dynamically adjusted to the rotational speeds of the carrousels 2, 4, so that jamming of dairy animals 7, 8 before the carrousels 2, 4 does hardly or not occur. The control device 13 calculates for example the threshold value in such a manner that the number of identified dairy animals which are classified per unit of time in the group of relatively fast-milking dairy animals 7 and in the group of relatively slow-milking dairy animals 8 approximately equals the number of relatively fast-milking dairy animals 7 which leave the first carrousel 2 per unit of time, the number of relatively slow-milking dairy animals 8 which leave the second carrousel 4, respectively. In this case, the control device 13 operates the drive device of each carrousel 2, 4 in such a manner that the rotational speeds of the carrousels 2, 4 correspond thereto.

In the embodiment shown in FIG. 1, the second passage 15 is designed as a closed waiting area, in which a number of relatively slow-milking dairy animals 8 can wait until a free milking stall 5 of the second carrousel 4 rotates towards the entrance 20. Therefore, the second passage 15 forms a buffer. In dependence on the control of the control device 13, the second passage 15 can, incidentally, not be designed as a waiting area and/or the first passage 17 can be designed as a closed waiting area. Between the first passage 17 and the second passage 15 there is disposed a gate device 19. In the case of maintenance or repair of one of the carrousels 2, 4, dairy animals 7, 8 already classified in one of the groups can be transferred from one to another passage 15, 17.

Figure 2:
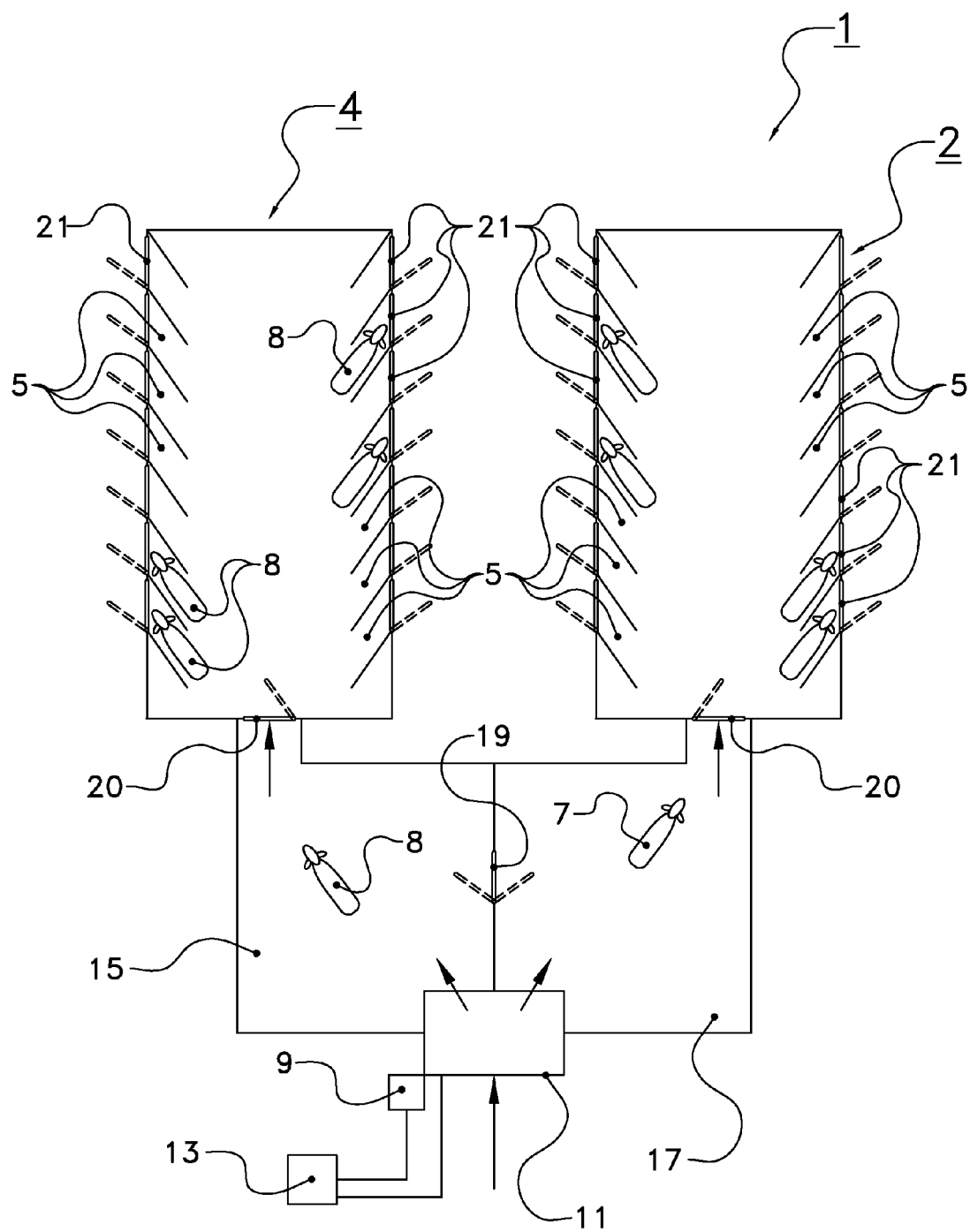
FIG. 2 is a schematic top view of a second embodiment of a milking system according to the invention.

FIG. 2 shows a second embodiment according to the invention. The same or similar components are denoted therein by the same reference numerals. Instead of being designed as carrousels, the milking devices 2, 4 are designed as two milking areas with milking stalls 5, each of which has an exit 21. Each milking stall 5 is further provided with milking facilities such as described above. The first passage 17 for the first milking area 2 and the second passage 15 for the second milking area 4 each comprise a waiting area for receiving a number of relatively fast, slow, respectively, dairy animals 7, 8. In contrast with the embodiment shown in FIG. 1, in which the relatively fast and slow dairy animals 7, 8 are admitted continuously to rotating carrousels, milking of the relatively fast and slow dairy animals 7, 8 in the milking areas 2, 4 takes place on the basis of batches. The relatively fast and slow dairy animals 7, 8 are admitted on the basis of batches to the first, second, respectively, milking area 2, 4. The treatment time for the milking of the relatively fast dairy animals 7 of the first batch is shorter than the treatment time for the milking of the relatively slow dairy animals 8 of the second batch. After all relatively fast dairy animals 7 of the first batch have been milked, said dairy animals 7 are led out of the first milking area 2. The relatively slow dairy animals 4 of the second batch are led out of the second milking area 4 after all relatively slow dairy animals 8 have been milked. The threshold value is dynamically controlled by the control device 13 in dependence on the capacity of the first milking area 2 and the second milking area 4. It can thus be avoided that the number of relatively fast and slow dairy animals 7, 8 in the waiting areas 15, 17 increases undesirably.

The invention is not limited to the exemplary embodiments shown in the figures. It will be possible for the person skilled in the art to apply various adaptations within the scope of the invention. The milking system according to the invention may, for example, comprise more than two milking devices, such as three, four or five milking devices. In that case, the dairy animals to be milked of the herd of dairy animals are classified in a number of groups of dairy animals, which number equals the number of milking devices. The milking stalls of the carrousels may form different configurations.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A milking system comprising a first milking device, an identification device for identifying dairy animals to be milked of a herd of dairy animals, and a control device which is configured to determine an estimated treatment time of each dairy animal to be milked when the animal reports to the milking station, and wherein the control device is configured to classify each dairy animal to be milked that has been identified by the identification device with the aid of a criterion on the basis of the estimated treatment time in at least a first or second group of dairy animals, and wherein the milking system is configured to admit at least one dairy animal classified in the first group to the first milking device in order to milk said dairy animal by the first milking device, wherein the milking system comprises a second milking device, and the milking system is configured to admit at least one dairy animal classified in the second group to the second milking device in order to milk said dairy animal by the second milking device, wherein the control device is further configured to classify each dairy animal to be milked that has been identified by the identification device in the first group of dairy animals if the estimated treatment time of said dairy animal is shorter than a threshold value and to classify each dairy animal to be milked that has been identified by the identification device in the second group of dairy animals if the estimated treatment time of said dairy animal is longer than that threshold value; wherein the control device is connected to a sorting device, the control device being further configured to operate the sorting device in dependence of the classification of the identified dairy animal; wherein the first milking device and the second milking device are each provided with a plurality of milking stalls for, in each case, one dairy animal, and wherein the milking system is configured to admit a plurality of dairy animals classified in the first group to only the first milking device in order to milk said dairy animals in the milking stalls of the first milking device, and wherein the milking system is configured to admit a plurality of dairy animals classified in the second group to only the second milking device in order to milk said dairy animals in the milking stalls of the second milking device.

2. The milking system according to claim 1, wherein the estimated treatment time of a dairy animal comprises at least one of: an estimated milking time for milking said dairy animal, and an estimated pre-treatment time for pre-treating said dairy animal prior to the milking.

3. The milking system according to claim 2, wherein the estimated pre-treatment time comprises at least one of: a time for pre-cleaning the teats of said dairy animal, an estimated connection time for connecting the teat cups to the teats of said dairy animal, and an estimated post-treatment time for post-treating said dairy animal after the milking.

4. The milking system according to claim 1, wherein the first milking device comprises a first carrousel and the second milking device comprises a second carrousel, and wherein each carrousel is provided with a plurality of milking stalls for in each case one dairy animal.

5. The milking system according to claim 4, wherein the rotational speed of the first carrousel is adjustable in dependence on the longest estimated treatment time for the milking of the dairy animals admitted to the first carrousel, and wherein the rotational speed of the second carrousel is adjustable in dependence on the longest estimated treatment time for the milking of the dairy animals admitted to the second carrousel.

6. The milking system according to claim 5, wherein the rotational speed of the first carrousel, the rotational speed of the second carrousel and the threshold value are controllable by the control device, and wherein the rotational speed of the first carrousel, the rotational speed of the second carrousel and the threshold value are controlled such that the number of dairy animals which are classified by the control device in the first group per unit of time substantially equals the number of dairy animals milked which leave the first carrousel per unit of time, and the number of dairy animals which are classified by the control device in the second group per unit of time substantially equals the number of dairy animals milked which leave the second carrousel per unit of time.

7. A method for milking a herd of dairy animals, comprising:
identifying each dairy animal that reports to the milking station to be milked,
determining an estimated treatment time of each dairy animal when the dairy animal reports to the milking station to be milked,
classifying each identified dairy animal to be milked with the aid of a criterion on the basis of the estimated treatment time in at least a first or second group of dairy animals,
controlling a sorting device in dependence of the classification of an identified dairy animal,
admitting at least one dairy animal classified in the first group to a first milking device,
milking the dairy animal admitted to the first milking device by the first milking device,
wherein at least one dairy animal classified in the second group is admitted to a second milking device and the dairy animal admitted to the second milking device is milked by the second milking device,
wherein each dairy animal to be milked that has been identified is classified in the first group of dairy animals if the estimated treatment time for the milking of said dairy animal is shorter than a threshold value and is classified in the second group of dairy animals if the estimated treatment time for the milking of said dairy animal is longer than that threshold value.

8. The method according to claim 7, wherein the first milking device and the second milking device are each provided with a plurality of milking stalls for in each case one dairy animal, and wherein a plurality of dairy animals classified in the first group are admitted to only the first milking device in order to milk said dairy animals in the milking stalls of the first milking device, and wherein a plurality of dairy animals classified in the second group are admitted to only the second milking device in order to milk said dairy animals in the milking stalls of the second milking device.

9. The method according to claim 8, wherein the pre-treatment time comprises at least one of: a time for pre-cleaning the teats of said dairy animal, an estimated connection time for connecting the teat cups to the teats of said dairy animal, and an estimated post-treatment time for post-treating said dairy animal after the milking.

10. The method according to claim 7, wherein the estimated treatment time for the milking of a dairy animal comprises at least one of: an estimated milking time for milking said dairy animal and an estimated pre-treatment time for pre-treating said dairy animal prior to the milking.

11. The method according to claim 7, wherein the first milking device comprises a first carrousel and the second milking device comprises a second carrousel, and wherein each carrousel is provided with a plurality of milking stalls for in each case one dairy animal.

12. The method according to claim 11, wherein the rotational speed of the first carrousel is set in dependence on the longest estimated treatment time for the milking of the dairy animals admitted to the first carrousel, and wherein the rotational speed of the second carrousel is set in dependence on the longest estimated treatment time for the milking of the dairy animals admitted to the second carrousel.

13. The method according to claim 12, wherein the rotational speed of the first carrousel, the rotational speed of the second carrousel, and the threshold value are controlled such that the number of dairy animals which are classified in the first group per unit of time substantially equals the number of dairy animals milked which leave the first carrousel per unit of time and the number of dairy animals which are classified in the second group per unit of time substantially equals the number of dairy animals milked which leave the second carrousel per unit of time.

14. The method according to claim 7, wherein a plurality of dairy animals classified in the first group are admitted on the basis of batches to the first milking device in order to milk said dairy animals on the basis of batches by the first milking device, and wherein a plurality of dairy animals classified in the second group are admitted on the basis of batches to the second milking device in order to milk said dairy animals on the basis of batches by the second milking device.

\* \* \* \* \*